United States Patent
Aota et al.

(10) Patent No.: US 8,414,443 B2
(45) Date of Patent: Apr. 9, 2013

(54) LOW FRICTION LOSS AUTOMATIC TRANSMISSION

(75) Inventors: Kazuaki Aota, Sagamihara (JP); Yukiyoshi Inuta, Isehara (JP); Akihiro Yamamoto, Hiratsuka (JP); Takayuki Okuda, Atsugi (JP); Joerg Mueller, Chemnitz (DE); Rico Resch, Chemnitz (DE); Mirko Leesch, Thum (DE)

(73) Assignee: Jatco Ltd, Fuji-shi (JP)

( * ) Notice: Subject to any disclaimer, the term of this patent is extended or adjusted under 35 U.S.C. 154(b) by 126 days.

(21) Appl. No.: 13/159,106

(22) Filed: Jun. 13, 2011

(65) Prior Publication Data

US 2012/0004067 A1 Jan. 5, 2012

(30) Foreign Application Priority Data

Jul. 2, 2010 (JP) .................................. 2010-151660

(51) Int. Cl.
*F16H 3/62* (2006.01)
(52) U.S. Cl. ........................................................ 475/275
(58) Field of Classification Search .................... None
See application file for complete search history.

(56) References Cited

U.S. PATENT DOCUMENTS

| 5,954,613 | A | * | 9/1999 | Park | 475/275 |
| 7,377,872 | B2 | * | 5/2008 | Jang | 475/275 |
| 2007/0105682 | A1 | * | 5/2007 | Inuta | 475/116 |
| 2011/0028262 | A1 | * | 2/2011 | Yamamoto et al. | 475/275 |
| 2011/0136616 | A1 | * | 6/2011 | Aota et al. | 475/296 |
| 2011/0306461 | A1 | * | 12/2011 | Aota et al. | 475/275 |

FOREIGN PATENT DOCUMENTS

| DE | 102 31 352 A1 | 2/2004 |
| JP | 2001-182785 A | 7/2001 |

* cited by examiner

*Primary Examiner* — Dirk Wright
(74) *Attorney, Agent, or Firm* — Foley & Lardner LLP

(57) ABSTRACT

An automatic transmission including a double pinion planetary gear unit PG1, two single pinion planetary gear units PG2 and PG3 and six frictional elements (viz., six clutches) C1 to C6 is so constructed as to establish nine forward speeds and one reverse speed by simultaneously putting selected three of the six frictional elements C1 to C6 into their engaged condition. The frictional elements C1 to C6 are of a type including mutually rotatable friction plates that cause production of an oil dragging resistance when the frictional element is under idling condition. With the simultaneously engaged condition of the three frictional elements, each speed is established with a reduced friction loss of the automatic transmission.

4 Claims, 7 Drawing Sheets

|  | C1 | C2 | C3 | C4 | C5 | C6 | GEAR RATIO | INTERSTAGE RATIO |
|---|---|---|---|---|---|---|---|---|
| 1ST |  | ○ |  | ○ | ○ |  | 4.086 | 1.621 |
| 2ND | ○ | ○ |  | ○ |  |  | 2.520 | 1.579 |
| 3RD | ○ |  |  | ○ | ○ |  | 1.596 | 1.220 |
| 4TH | ○ |  | ○ | ○ |  |  | 1.309 | 1.309 |
| 5TH | ○ |  |  | ○ |  | ○ | 1.000 | 1.256 |
| 6TH | ○ |  | ○ |  |  | ○ | 0.796 | 1.309 |
| 7TH | ○ |  |  |  | ○ | ○ | 0.608 | 1.183 |
| 8TH |  |  | ○ |  | ○ | ○ | 0.514 | 1.212 |
| 9TH |  |  |  | ○ | ○ | ○ | 0.424 |  |
| REV |  | ○ |  |  | ○ | ○ | -4.452 |  |

ρ1 = -4.493
ρ2 = 0.658   RC = 9.637
ρ3 = 0.327   REV/1ST = 1.090

NUMBER OF ENGAGEMENTS OF GEARS

SINGLE PINION TYPE = 2
DOUBLE PINION TYPE = 3

|  | 1ST | 2ND | 3RD | 4TH | 5TH | 6TH | 7TH | 8TH | 9TH | MEAN NUMBER OF ENGAGEMENTS OF GEARS |
|---|---|---|---|---|---|---|---|---|---|---|
| PG1 | 3 | 0 | 3 | 3 | 0 | 3 | 3 | 3 | 3 |  |
| PG2 | 0 | 0 | 2 | 2 | 0 | 2 | 2 | 2 | 2 |  |
| PG3 | 2 | 2 | 2 | 2 | 0 | 2 | 0 | 0 | 2 |  |
| TOTAL | 5 | 2 | 7 | 7 | 0 | 7 | 5 | 5 | 7 | 5.00 |

FIG.4
| C1 | 1.23 |
|----|------|
| C2 | 2.77 |
| C3 | 0.48 |
| C4 | 1.77 |
| C5 | 1.57 |
| C6 | 2.77 |
FIG.5
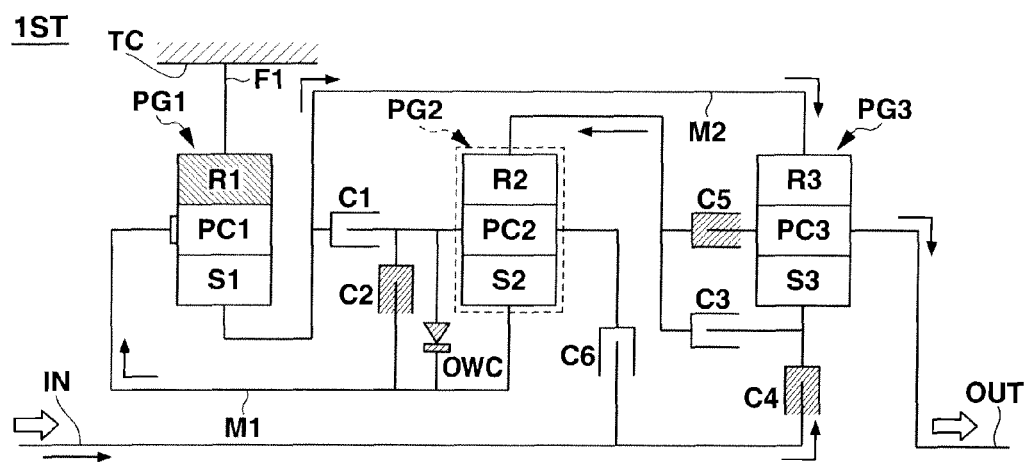
FIG.6
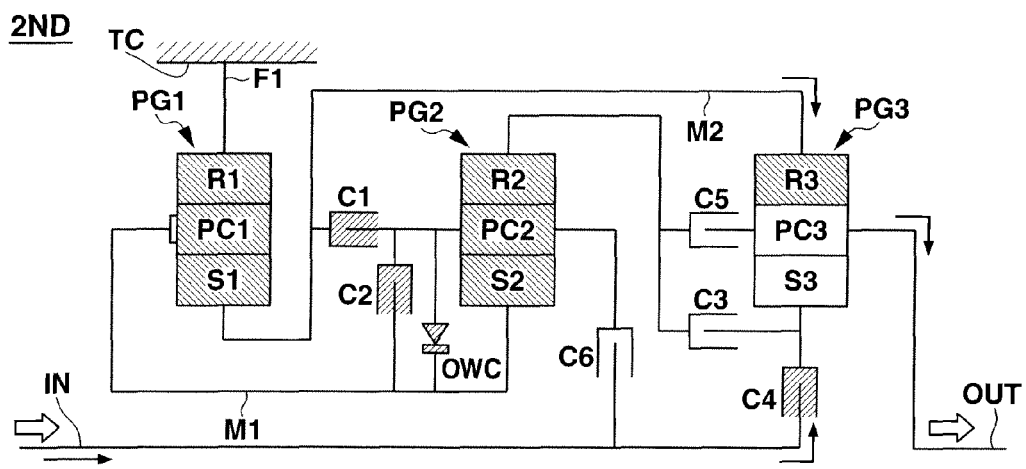

FIG.16

$\rho 1 = -0.375$  RC = 6.397
$\rho 2 = 0.500$   REV1/1ST = 0.750
$\rho 3 = -0.375$  REV2/1ST = 0.469

| | C1 | C2 | C3 | C4 | B1 | B2 | GEAR RATIO | INTERSTAGE RATIO |
|---|---|---|---|---|---|---|---|---|
| 1ST | ○ | | | | | ○ | 4.267 | 1.714 |
| 2ND | ○ | | | | ○ | | 2.489 | 1.556 |
| 3RD | ○ | ○ | | | | | 1.600 | 1.214 |
| 4TH | ○ | | | ○ | | | 1.318 | 1.132 |
| 5TH | ○ | | ○ | | | | 1.164 | 1.164 |
| 6TH | | | ○ | ○ | | | 1.000 | 1.188 |
| 7TH | | ○ | ○ | | | | 0.842 | 1.262 |
| 8TH | | | ○ | ○ | | | 0.667 | |
| REV1 | | ○ | | | | ○ | -3.200 | |
| REV2 | | | | ○ | | ○ | -2.000 | |

FIG.17

NUMBER OF ENGAGEMENTS OF GEARS

SINGLE PINION TYPE = 2
DOUBLE PINION TYPE = 3

| | 1ST | 2ND | 3RD | 4TH | 5TH | 6TH | 7TH | 8TH | MEAN NUMBER OF ENGAGEMENTS OF GEARS |
|---|---|---|---|---|---|---|---|---|---|
| PG1 | 3 | 3 | 3 | 3 | 3 | 0 | 3 | 0 | |
| PG2 | 0 | 2 | 0 | 2 | 0 | 0 | 2 | 2 | |
| PG3 | 3 | 3 | 0 | 3 | 3 | 0 | 0 | 0 | |
| TOTAL | 6 | 8 | 3 | 8 | 6 | 0 | 5 | 2 | 4.75 |

FIG.18

| | |
|---|---|
| C1 | 1.600 |
| C2 | 1.600 |
| C3 | 1.500 |
| C4 | 0.500 |
| B1 | 0.889 |
| B2 | 4.800 |

LOW FRICTION LOSS AUTOMATIC TRANSMISSION

BACKGROUND OF THE INVENTION

1. Field of the Invention

The present invention relates to stepwisely variable automatic transmissions of motor vehicles, and more particularly to the stepwisely variable automatic transmissions of a type that exhibits a reduced friction loss at each speed established.

2. Description of the Related Art

Japanese Laid-open Patent Application (Tokkai) 2001-182785 shows a stepwisely variable automatic transmission that establishes eight forward speeds and two reverse speeds by operating three planetary gear units and six frictional elements in a controlled manner. The three planetary gear units are a double pinion type planetary gear unit, a Ravigneaux-double pinion type planetary gear unit and a Ravigneaux-single pinion type planetary gear unit, and the six frictional elements are four clutches and two brakes.

SUMMARY OF THE INVENTION

In the automatic transmission disclosed by the above-mentioned Japanese Laid-open Patent Application, each forward speed is established by putting selected two of the six frictional elements into their engaged condition. This means that under each forward speed, remaining four frictional elements are in their idling condition, which, for the following reasons, brings about a remarkable friction loss caused by oil churned by the remaining four idling frictional elements. As is known, such friction loss lowers a transfer efficiency of power from the engine to driven road wheels of an associated motor vehicle.

That is, in multi-plate type clutches and brakes that are widely used as the frictional elements of automatic transmissions, oil fed to the clutches and brakes for cooling and lubricating the same causes production of so-called oil dragging resistance (or resistance against oil shearing) when the clutches or brakes are in their idling condition. That is, during idling condition, the oil fed between mutually rotatable friction plates of each of the idling clutches or brakes is inevitably churned or stirred by the same thereby causing production of a considerable resistance (viz., oil dragging resistance) against rotation of a temporarily united train of parts that contributes to establish a desired speed, which however increases a friction loss of the automatic transmission.

Thus, an object of the present invention is to provide a stepwisely variable automatic transmission which comprises three planetary gear units and six frictional elements and establishes at least eight forward speeds while avoiding the above-mentioned remarkable friction loss.

That is, in the stepwisely variable automatic transmission of the present invention, the friction loss produced at each speed is reduced or at least minimized for increasing the transfer efficiency of power from the engine to the driven road wheels.

In accordance with the present invention, there is provided an automatic transmission which comprises input and output shafts (IN, OUT); a first planetary gear unit (PG1) of double pinion type, that includes a first sun gear (S1), a first ring gear (R1) and a first carrier (PC1) that carries first double pinions (P1s) and (P1r) that mesh with both the first sun gear (S1) and the first ring (R1); a second planetary gear unit (PG2) of single pinion type, that includes a second sun gear (S2), a second ring gear (R2) and a second carrier (PC2) that carries second single pinions (P2) that mesh with both the second sun gear (S2) and the second ring gear (R2); a third planetary gear unit (PG3) of single pinion type, that includes a third sun gear (S3), a third ring gear (R3) and a third carrier (PC3) that carries third single pinions (P3) that mesh with both the third sun gear (S3) and the third ring gear (R3); and six frictional elements (C1 to C6), each frictional element including rotatable friction plates that cause production of an oil dragging resistance when the friction element is under idling condition, wherein by selectively engaging and disengaging the six frictional elements, a torque of the input shaft (IN) is transmitted to the output shaft (OUT) while making a rotation speed change therebetween to establish at least eight forward speeds, wherein the output shaft (OUT) is constantly connected to the third carrier (PC3), the first ring gear (R1) is constantly connected to a first fixing member (F1) to be fixed, the first carrier (PC1) and the second sun gear (S2) are constantly connected to constitute a first rotatable member (M1), the first sun gear (S1) and the third ring gear (R3) are constantly connected to constitute a second rotatable member (M2), and wherein the six frictional elements are a first frictional element (first clutch C1) that selectively connects the second carrier (PC2) and the second rotatable member (M2), a second frictional member (second clutch C2) that selectively connects the second carrier (PC2) and the first rotatable member (M1), a third frictional member (third clutch C3) that selectively connects the second ring gear (R2) and the third sun gear (S3), a fourth frictional element (fourth clutch C4) that selectively connects the input shaft (IN) and the third sun gear (S3), a fifth frictional element (fifth clutch C5) that selectively connects the second ring gear (R2) and the third carrier (PC3) and a sixth frictional element (sixth clutch C6) that selectively connects the input shaft (IN) and the second carrier (PC2); and wherein by simultaneously putting selected three of the six frictional elements into their engaged condition, at least eight forward speeds and one reverse speed are established.

An automatic transmission of the invention may have an arrangement wherein by simultaneously putting selected three of the six frictional elements into their engaged condition, nine forward speeds are established, in which a first forward speed is established by simultaneously putting second, fourth and fifth frictional elements into their engaged condition; a second forward speed is established by simultaneously putting first, second and fourth frictional elements into their engaged condition; a third forward speed is established by simultaneously putting first, fourth and fifth frictional elements into their engaged condition; a fourth forward speed is established by simultaneously putting first, third and fourth frictional elements into their engaged condition; a fifth forward speed is established by simultaneously putting first, fourth and sixth frictional elements into their engaged condition; a sixth forward speed is established by simultaneously putting first, third and sixth frictional elements into their engaged condition; a seventh forward speed is established by simultaneously putting first, fifth and sixth frictional elements into their engaged condition; an eighth forward speed is established by simultaneously putting third, fifth and sixth frictional elements into their engaged condition; and a ninth forward speed is established by simultaneously putting fourth, fifth and sixth frictional elements into their engaged condition.

An automatic transmission of the present invention may further have an arrangement wherein the reverse speed is established by simultaneously putting second, fourth and sixth frictional elements into their engaged condition.

An automatic transmission of the present invention may further have an arrangement in which the six frictional elements are all clutches.

As is understood from the above, in the automatic transmission of the present invention, each speed is established by simultaneously putting selected three of the six frictional elements (or clutches) into their engaged condition leaving the remaining three frictional elements (or clutches) in their idling condition. Reduction in number of the frictional elements (or clutches) that are idle at each established speed brings about reduction in friction loss of the transmission.

BRIEF DESCRIPTION OF THE DRAWINGS

Other objects and advantages of the present invention will become apparent from the following description when taken in conjunction with the accompanying drawings, in which:

FIG. 4 is a table showing the maximum torque share rate of each frictional element (C1, C2, C3, C4, C5 or C6) in the automatic transmission of the invention;

FIG. 5 is a view similar to FIG. 1, but showing a condition wherein the transmission takes a first speed (viz., $1^{st}$ speed);

FIG. 6 is a view similar to FIG. 1, but showing a condition wherein the transmission takes a second speed (viz., $2^{nd}$ speed);

FIG. 16 is a table showing ON/OFF condition of six frictional elements (four clutches and two brakes) used in the known automatic transmission at each speed (eight forward speeds and two reverse speeds), each speed being established by simultaneously putting selected two of the six frictional elements into their engaged condition;

FIG. 17 is a table showing the number of engagements of gears of each of three planetary gear units at each forward speed (eight forward speeds) in the known automatic transmission; and FIG. 18 is a table showing the maximum torque share rate of each frictional element (C1, C2, C3, C4, B1 or B2) in the known automatic transmission.

DETAILED DESCRIPTION OF THE INVENTION

In the following, the stepwisely variable automatic transmission of the present invention will be described in detail with reference to the accompanying drawings.

Figures 1, 2, 3:
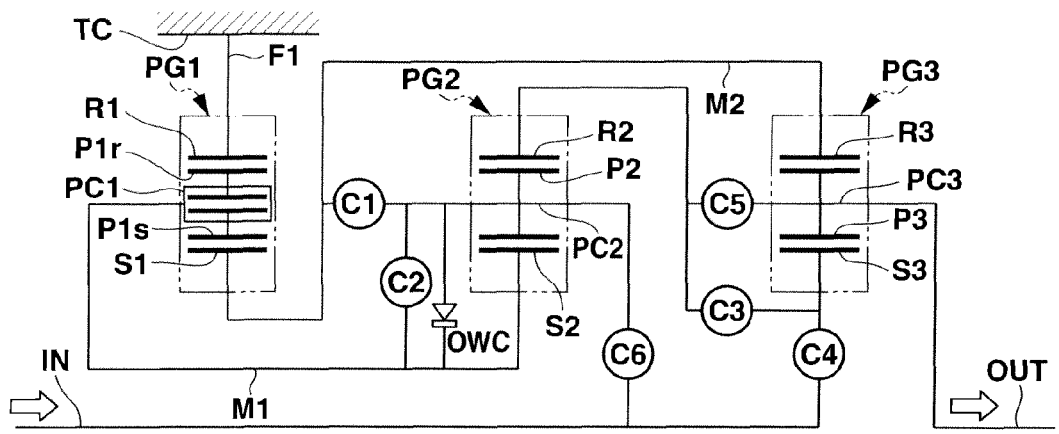
FIG. 1 is a schematic diagram of an automatic transmission according to the present invention.
FIG. 2 is a table showing ON/OFF condition of six frictional elements (or clutches) used in the automatic transmission of the invention at each speed (nine forward speeds and one reverse speed), each speed being established by simultaneously putting selected three of the six frictional elements (clutches) into their engaged condition.
FIG. 3 is a table showing the number of engagements effected by gears of each of three planetary gear units at each forward speed (nine forward speeds)

Referring to FIG. 1, there is schematically shown the stepwisely variable automatic transmission according to the present invention.

As shown in FIG. 1, the stepwisely variable automatic transmission generally comprises an input shaft IN, an output shaft OUT, a first planetary gear unit PG1, a second planetary gear unit PG2, a third planetary gear unit PG3, a first rotatable member M1, a second rotatable member M2, a first fixing member F1, a first clutch C1 (or first frictional element), a second clutch C2 (or second frictional element), a third clutch C3 (or third frictional element), a fourth clutch C4 (or fourth frictional element), a fifth clutch C5 (or fifth frictional element), a sixth clutch C6 (or sixth frictional element) and a transmission case TC.

The first planetary gear unit PG1 is of a double pinion type with first double pinions P1s and P1r, and comprises a first sun gear S1, a first carrier PC1 that carries pinions P1s meshed with first gear 51 and pinions P1r meshed with pinions P1s, and a first ring gear R1 that is meshed with pinions P1r.

The second planetary gear unit PG2 is of a single pinion type and comprises a second sun gear S2, a second carrier PC2 that carries second pinions P2 meshed with second sun gear S2, and a second ring gear R2 that is meshed with second pinions P2.

The third planetary gear unit PG3 is of a single pinion type and comprises a third sun gear S3, a third carrier PC3 that carries third pinions P3 meshed with third sun gear S3, and a third ring gear R3 that is meshed with third pinions P3.

The input shaft IN is a shaft for receiving a torque from an engine (not shown) through a torque converter (not shown).

The output shaft OUT is a shaft for outputting a controlled torque to drive road wheels (not shown) of an associated motor vehicle (not shown) through a propeller shaft (not shown) and a final gear (not shown). As shown, output shaft OUT is constantly connected to third carrier PC3.

The first rotatable member M1 is a member for constantly coupling first carrier PC1 and second sun gear S2 without putting therebetween any frictional element.

The second rotatable member M2 is a member for constantly coupling first sun gear S1 and third ring gear R3 without putting therebetween any frictional element.

The first fixing member F1 is a member for constantly fixing first ring gear R1 to transmission case TC.

The first to sixth clutches C1 to C6 are of a type that includes mutually rotatable friction plates that cause production of an oil dragging resistance when the clutch is in the idling condition.

The first clutch C1 is a first frictional element that selectively connects and disconnects second carrier PC2 and second rotatable member M2.

The second clutch C2 is a second frictional element that selectively connects and disconnects second carrier PC2 and first rotatable member M1. As shown, one-way clutch OWC is arranged in parallel with second clutch C2. The one-way clutch OWC becomes locked when driven and unlocked when coasted.

The third clutch C3 is a third frictional element that selectively connects and disconnects second ring gear R2 and third sun gear S3.

The fourth clutch C4 is a fourth frictional element that selectively connects and disconnects input shaft IN and third sun gear S3

The fifth clutch C5 is a fifth frictional element that selectively connects and disconnects second ring gear R2 and third carrier PC3.

The sixth clutch C6 is a sixth frictional element that selectively connects and disconnects input shaft IN and second carrier PC2.

As shown in FIG. 1, first, second and third planetary gear units PG1, PG2 and PG3 are arranged axially in this order in a direction from input shaft IN to output shaft OUT.

In FIG. 2, there is shown a table that shows ON/OFF condition of the six frictional elements C1 to C6 at each of the nine forward speeds and one reverse speed.

As is well understood from this table, each speed is established by simultaneously putting three frictional elements into their engaged condition.

In the present invention, for establishing each speed, the simultaneously engaged condition of selected three of the six frictional elements is important, as will become apparent as the description proceeds.

In FIG. 3, there is shown a table that shows the number of engagements effected by gears of each of the three planetary gear units at each forward speed.

The meaning of the "number of engagements" effected by gears will become apparent from the following description.

In case of a single pinion type planetary gear unit like the second unit PG2, the number of engagements is represented by 2 (two) which is calculated by adding 1 (one) engagement made between second sun gear S2 and second pinion P2 and 1 (one) engagement made between second pinion P2 and second ring gear R2. While, in case of a double pinion type planetary gear unit like the first unit PG1, the number of engagements is represented by 3 (three) which is calculated by adding 1 (one) engagement made between first sun gear S1 and first pinion P1s, 1 (one) engagement made between first pinion P1s and second pinion P1r and 1 (one) engagement made between second pinion P1r and first ring gear R1. It is to be noted that such number of engagements is established only when the gears are in a condition to take part in speed change. Thus, when the gears are in such a condition as not to take part in speed change, the number of engagement is represented by 0 (zero).

That is, when taking part in speed change, first planetary gear unit PG1 that is of a double pinion type indicates 3 (three) engagements and second and third planetary gear units PG2 and PG3 that are of a single pinion type indicate each 2 (two) engagements.

In the following, a speed change manner for establishing each speed will be described with the aid of the tables of FIGS. 2 and 3

As is mentioned hereinabove, by simultaneously putting three of the six frictional elements C1 to C6 into their engaged condition, nine forward speeds and one reverse speed are established respectively.

As shown in the table of FIG. 2, first speed ($1^{st}$ speed) is established when second clutch C2 (or one-way clutch OWC), fourth clutch C4 and fifth clutch C5 are simultaneously put into their engaged condition. As shown in the table of FIG. 3, the number of engagements effected by gears at this first speed is five (viz., 5=3+0+2) because first planetary gear unit PG1 and third planetary gear unit PG3 take part in the gear engagement.

As shown in the table of FIG. 2, second speed ($2^{nd}$ speed) is established when first clutch C1, second clutch C2 (or one-way clutch OWC) and fourth clutch C4 are simultaneously put into their engaged condition. As shown in the table of FIG. 3, the number of engagements effected by gears at this second speed is two (viz., 2=0+0+2) because only third planetary gear unit PG3 takes part in the gear engagement.

As shown in the table of FIG. 2, third speed ($3^{rd}$ speed) is established when first clutch C1, fourth clutch C4 and fifth clutch C5 are simultaneously put into their engaged condition. As shown in the table of FIG. 3, the number of engagements effected by gears at this third speed is seven (viz., 7=3+2+2) because all the first, second and third planetary gear units PG1, PG2 and PG3 takes part in the gear engagement.

As shown in the table of FIG. 2, fourth speed ($4^{th}$ speed) is established when first clutch C1, third clutch C3 and fourth clutches C4 are simultaneously put into their engaged condition. As shown in the table of FIG. 3, the number of engagements effected by gears at this fourth speed is seven (viz., 7=3+2+2) because all the first, second and third planetary gear units PG1, PG2 and PG3 takes part in the gear engagement.

As shown in the table of FIG. 2, fifth speed ($5^{th}$ speed) is established when first clutch C1, fourth clutch C4 and sixth clutch C6 are simultaneously put into their engaged condition. As shown in the table of FIG. 3, the number of engagements effected by gears at this fifth speed is 0 (viz., 0=0+0+0) because any of the first, second and third planetary gear units PG1, PG2 and PG3 does not take part in the gear engagement.

As shown in the table of FIG. 2, sixth speed ($6^{th}$ speed) is established when first clutch C1, third clutch C3 and sixth clutch C6 are simultaneously put into their engaged condition. As shown in the table of FIG. 3, the number of engagements effected by gears at this sixth speed is seven (viz., 7=3+2+2) because all of the first, second and third planetary gear units PG1, PG2 and PG3 takes part in the gear engagement.

As shown in the table of FIG. 2, seventh speed ($7^{th}$ speed) is established when first clutch C1, fifth clutch C5 and sixth clutch C6 are simultaneously put into their engaged condition. As shown in the table of FIG. 3, the number of engagements effected by gears at this seventh speed is five (viz., 5=3+2+0) because first and second planetary gear units PG1 and PG2 take part in the gear engagement.

As shown in the table of FIG. 2, eighth speed ($8^{th}$ speed) is established when third clutch C3, fifth clutch C5 and sixth clutch C6 are simultaneously put into their engaged condition. As shown in the table of FIG. 3, the number of engagements effected by gears at this eighth speed is five (viz., 5=3+2+0) because first and second planetary gear units PG1 and PG2 take part in the gear engagement.

As shown in the table of FIG. 2, ninth speed ($9^{th}$ speed) is established when fourth clutch C4, fifth clutch C5 and sixth clutch C6 are simultaneously put into their engaged condition. As shown in the table of FIG. 3, the number of engagements effected by gears at this ninth speed is seven (viz., 7=3+2+2) because all of the first, second and third planetary gear units PG1, PG2 and PG3 takes part in the gear engagement.

As shown in the table of FIG. 2, reverse speed (Rev speed) is established when second clutch C2, fourth clutch C4 and sixth clutch C6 are simultaneously put into their engaged condition.

FIG. 4 is a table that shows the maximum torque share rate of each of the first to sixth clutches C1 to C6 (or six frictional elements).

It is to be noted that the torque share rate is a rate of torque applied to each of the clutches C1 to C6 relative to an input torque which is represented by 1 (one) and the maximum torque share rate is the maximum one of the share rates of torque applied to the clutches C1 to C6 (frictional elements) when these clutches C1 to C6 take part in establishing first to ninth speeds and one reverse speed. With increase of the maximum torque share rate, the torque applied to the clutch C1, C2, C3, C4, C5 or C6 increases and thus, the number of the friction plates used in the clutch increases resulting in increase of size of the clutch and increase of cost of the same.

In the following, the maximum torque share rate of each clutch C1, C2, C3, C4, C5 or C6 will be described with the aid of the table of FIG. 4.

Although first clutch C1 takes the engaged condition in second, third, fourth, fifth, sixth and seventh speeds, it shows the maximum torque share rate in the third speed, which is 1.23.

Although second clutch C2 takes the engaged condition in first, second and reverse speeds, it shows the maximum torque share rate in the reverse speed, which is 2.77.

Although third clutch C3 takes the engaged condition in fourth, sixth and eighth speeds, it shows the maximum torque share rate of in the fourth speed, which is 0.48.

Although fourth clutch C4 takes the engaged condition in first, second, third, fourth, fifth, ninth and reverse speeds, it shows the maximum torque share rate in the reverse speed, which is 1.77.

Although fifth clutch C5 takes the engaged condition in first, third, seventh, eighth and ninth speeds, it shows the maximum torque share rate in the first speed, which is 1.57.

Although sixth clutch C6 takes the engaged condition in fifth, sixth, seventh, eighth, ninth and reverse speeds, it shows the maximum torque share rate in the reverse speed, which is 2.77.

In the following, operation of the automatic transmission of the invention will be described with the aid of the drawings.

Speed Change Operation in Each Speed:

First Speed:

As is indicated by hatched blocks in FIG. 5, for establishing the first speed under driving condition, one-way clutch OWC, fourth clutch C4 and fifth clutch C5 are simultaneously put into their engaged condition, and for establishing the first speed under coasting condition, second clutch C2, fourth clutch C4 and fifth clutch C5 are simultaneously put into their engaged condition.

Due to engagement of fourth clutch C4, input shaft IN is tightly connected to third sun gear S3. Due to engagement of second clutch C2 (or self-lock of one-way clutch OWC), engagement of fifth clutch C5 and the presence of first rotatable member M1, second sun gear S2 and second carrier PC2 of second planetary gear unit PG2 are tightly connected, so that second sun gear S2, second carrier PC2 and second ring gear R2 of second planetary gear unit PG2 are conditioned to integrally revolve and at the same time, first carrier PC1, second planetary gear unit PG2 and third carrier PC3 are tightly connected together.

When, under this condition, a certain torque is led through input shaft IN to third sun gear S3, third carrier PC3 and third ring gear R3 of third planetary gear unit PG3 are rotated while being restricted by rotation of first sun gear S1 and first carrier PC1 of first planetary gear unit PG1. For restricting the rotation of third carrier PC3 and third ring gear R3, first carrier PC1 and third carrier PC3 are conditioned to keep the same rotation speed through second clutch C2 (or one-way clutch OWC), fifth clutch C5, first rotatable member M1 and second planetary gear unit PG2, and at the same time, first sun gear S1 and third ring gear R3 are conditioned to keep the same rotation speed through second rotatable member M2. Due to the above-mentioned restriction to the rotation of third carrier PC3 and third ring gear R3, the rotation speed (or number of revolutions) of third carrier PC3 indicates a value that is lower than the rotation speed of input shaft IN. The output rotation (viz., the rotation with a reduced rotation speed lower than input shaft rotation speed) from third carrier PC3 is directly transmitted to output shaft OUT to establish the first speed.

Second Speed:

As is indicated by hatched blocks in FIG. 6, for establishing the second speed under driving condition, one-way clutch OWC, first clutch C1 and fourth clutch C4 are simultaneously put into their engaged condition, and for establishing the second speed under coasting condition, first clutch C1, second clutch C2 and fourth clutch C4 are simultaneously put into their engaged condition.

Due to engagement of fourth clutch C4, input shaft IN is tightly connected to third sun gear S3. Due to engagement of first clutch C1, engagement of second clutch C2 (or self-lock of one-way clutch OWC), the presence of first and second rotatable members M1 and M2 and the presence of first fixing member F1, the three rotating members S1, PC1 and R1 of first planetary gear unit PG1 and the three rotating members S2, PC2 and R2 of second planetary gear unit PG2 are integrally connected to transmission case TC, and at the same time, third ring gear R3 is tightly connected to transmission case TC.

When, under this condition, a certain torque is led through input shaft IN to third sun gear S3, the input rotation speed from input shaft IN is reduced by third planetary gear unit PG3 whose ring gear R3 is kept fixed, so that reduced rotation speed is outputted from third carrier PC3. The output rotation (viz., the rotation with a reduced rotation speed lower than the input shaft rotation speed but higher than a speed provided at the first speed) from third carrier PC3 is directly transmitted to output shaft OUT to establish the second speed.

Figure 7:
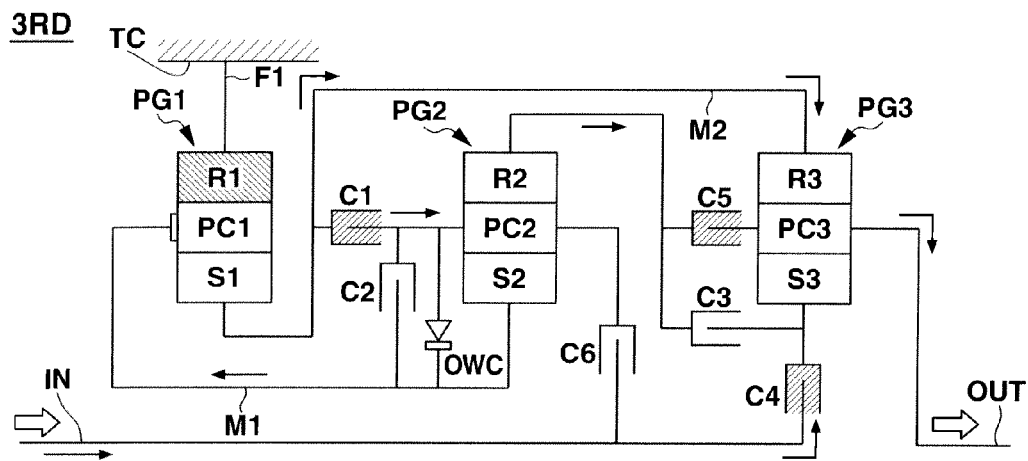
FIG. 7 is a view similar to FIG. 1, but showing a condition wherein the transmission takes a third speed (viz., $3^{rd}$ speed)

Third Speed:

As is indicated by hatched blocks in FIG. 7, for establishing the third speed under driving or coasting condition, first clutch C1, fourth clutch C4 and fifth clutch C5 are simultaneously put into their engaged condition.

Due to engagement of fourth clutch C4, input shaft IN is tightly connected to third sun gear S3. Due to the engagement of first clutch C1 and the presence of second rotatable member M2, first sun gear 51, second carrier PC2 and third ring gear R3 are connected together. Due to engagement of fifth clutch C5, second ring gear R2 is tightly connected to third carrier PC3.

When, under this condition, a certain torque is led through input shaft IN to third sun gear S3, third carrier PC3 and third ring R3 of third planetary gear unit PG3 are rotated while being restricted by second carrier PC2 and second ring gear R2 of second planetary gear unit PG2. Under this condition, second sun gear S2 and second carrier PC2 of second planetary gear unit PG2 are rotated while being restricted by first sun gear S1 and first carrier PC1 of first planetary gear unit PG1 whose ring gear R1 is kept fixed. For the restriction, first carrier PC1 and second sun gear S2 are conditioned to keep the same rotation speed through first rotatable member M1, and first sun gear S1, second carrier PC2 and third ring gear R3 are conditioned to keep the same rotation speed through first clutch C1 and second rotatable member M2, and second ring gear R2 and third carrier PC3 are conditioned to keep the same rotation speed through fifth clutch C5. By the above-mentioned restriction, the rotation speed (or number of revolutions) of third carrier PC3 is determined. The output rotation (viz., the rotation with a reduced rotation speed lower than input shaft rotation speed but higher than a speed provided at the second speed) from third carrier PC3 is directly transmitted to output shaft OUT thereby to establish the third speed.

Figure 8:
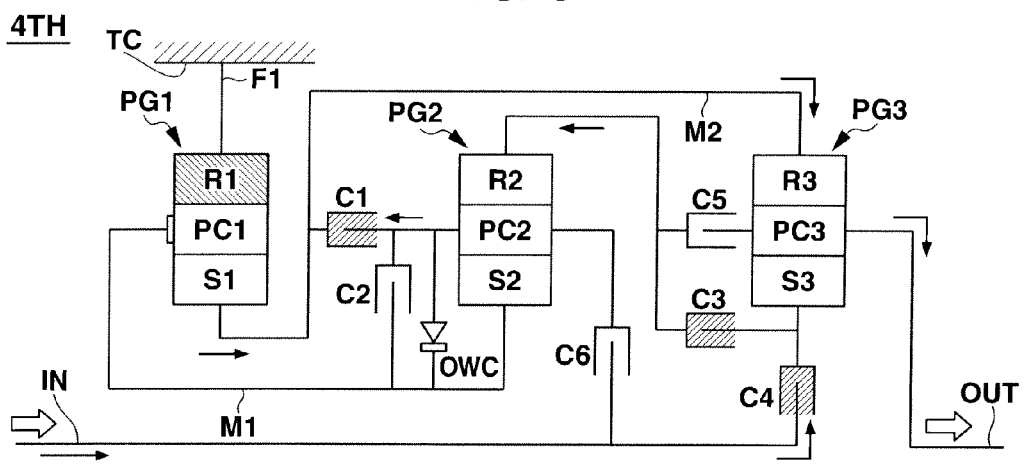
FIG. 8 is a view similar to FIG. 1, but showing a condition wherein the transmission takes a fourth speed (viz., $4^{th}$ speed)

Fourth Speed:

As is indicated by hatched blocks in FIG. 8, for establishing the fourth speed under driving or coasting condition, first clutch C1, third clutch C3 and fourth clutch C4 are simultaneously put into their engaged condition.

Due to the simultaneous engaged condition of third clutch C3 and fourth clutch C4, input shaft IN, second ring gear R2 and third sun gear S3 are tightly connected together. Due to the engagement of first clutch C1 and the presence of second rotatable member M2, first sun gear S1, second carrier PC2 and third ring gear R3 are tightly connected together.

Accordingly, when input shaft IN is rotated at a certain speed, second ring gear R2 and third sun gear S3 are rotated. In this case, second sun gear S2 and second carrier PC2 of second planetary gear unit PG2 are rotated while being restricted by first sun gear S1 and first carrier PC1 of first planetary gear unit PG1 whose ring gear R1 is kept fixed. For the restriction, first carrier PC1 and second sun gear S2 are conditioned to keep the same rotation speed through first rotatable member M1, and at the same time, first sun gear S1 and second carrier PC2 are conditioned to keep the same rotation speed through first clutch C1 and second rotatable member M2. The rotation of second carrier PC2 determined by the restriction effect is led to third ring gear R3 without change in rotation speed through first clutch C1 and second rotatable member M2. Accordingly, in third planetary gear unit PG3 that is subjected to a two-inputs and one-output state, the rotation speed of third sun gear S3 (=input shaft rotation speed) and that of third ring gear R3 are determined, and thus, the rotation speed of third carrier PC3 is determined. The output rotation (viz., the rotation speed with a reduced rotation speed lower than the input shaft rotation speed but higher than a speed provided at the third speed) from third carrier PC3 is directly transmitted to output shaft OUT to establish the fourth speed.

Figure 9:
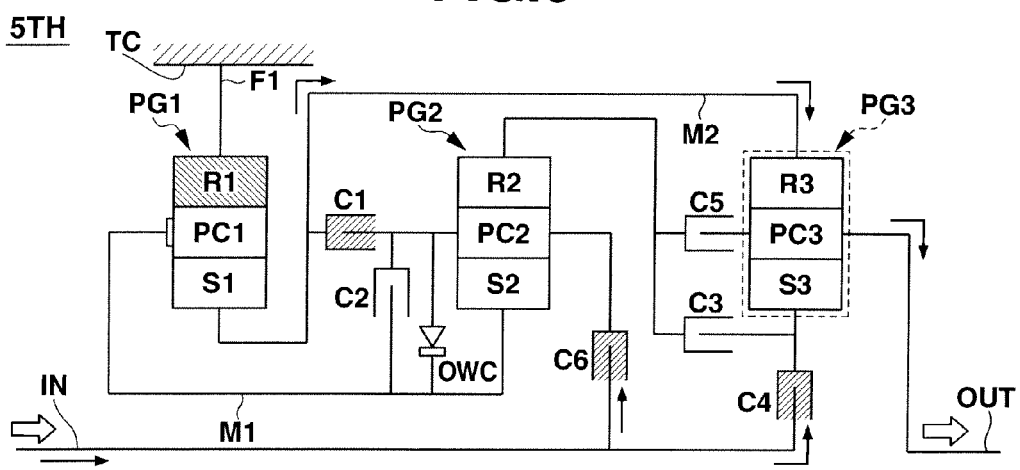
FIG. 9 is a view similar to FIG. 1, but showing a condition wherein the transmission takes a fifth speed (viz., $5^{th}$ speed)

Fifth Speed:

As is indicated by hatched blocks in FIG. 9, for establishing the fifth speed under driving or coasting condition, first clutch C1, fourth clutch C4 and sixth clutch C6 are simultaneously put into their engaged condition.

Due to the simultaneous engaged condition of first clutch C1, fourth clutch C4 and sixth clutch C6 and the presence of second rotatable member M2, the two rotating elements S3 and R3 of third planetary gear unit PG3 are tightly connected together. With this, the three rotating elements S3, PC3 and R3 of third planetary gear unit PG3 are conditioned to integrally revolve and at the same time, input shaft IN, first sun gear S1, second carrier PC2 and third planetary gear unit PG3 are tightly connected together.

Accordingly, when, under this condition, input shaft IN is rotated at a certain speed, third planetary gear unit PG3 is integrally revolved. The revolution of third planetary gear unit PG3 is outputted from third carrier PC3. The output rotation (viz., the rotation with the same speed as input shaft IN) from the third carrier PC3 is directly transmitted to output shaft OUT to establish the fifth speed.

Figure 10:
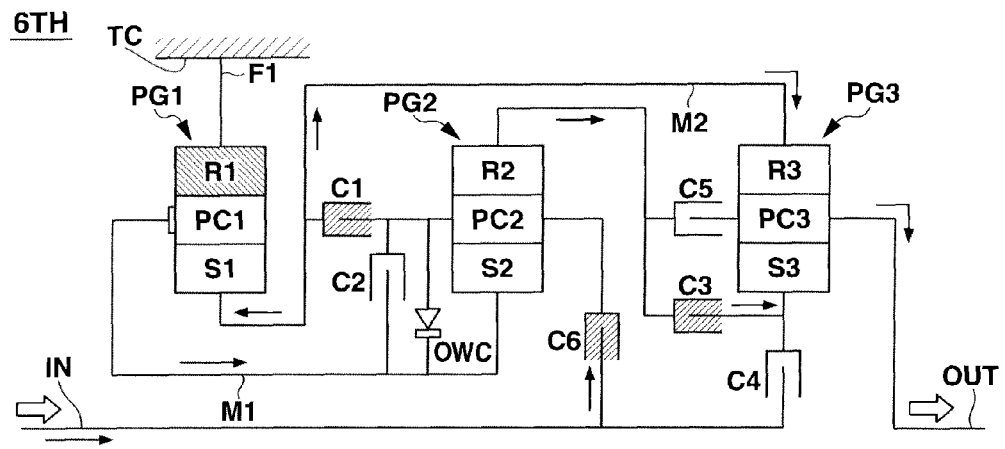
FIG. 10 is a view similar to FIG. 1, but showing a condition wherein the transmission takes a sixth speed (viz., $6^{th}$ speed)

Sixth Speed:

As is indicated by hatched blocks in FIG. 10, for establishing the sixth speed under driving or coasting condition, first clutch C1, third clutch C3 and sixth clutch C6 are simultaneously put into their engaged condition.

Due to the simultaneous engaged condition of clutch C1 and clutch C6 and the presence of second rotatable member M2, input shaft IN, first sun gear S3, second carrier PC2 and third ring gear R3 are tightly connected together. Due to the engagement of third clutch C3, second ring gear R2 and third sun gear S3 are tightly connected together.

Accordingly, when, under this condition, input shaft IN is rotated at a certain speed, the rotation of input shaft IN is led to first sun gear S1, second carrier PC2 and third ring gear R3. Upon this, in first planetary gear unit PG1 whose ring gear R1 is kept fixed, first carrier PC1 outputs a rotation whose direction is opposite to that of input shaft IN. The rotation of first carrier PC1 is led through first rotatable member M1 to second sun gear S2 without change in speed. Accordingly, in second planetary gear unit PG2 that is subjected to a two-inputs and one-output state, the rotation speed of second sun gear S2 and that of second carrier PC2 (=input shaft rotation speed) are determined, and thus, the rotation speed of second ring gear R2 is determined. The rotation of the second ring gear R2 is transmitted through third clutch C3 to third sun gear S3 without change in speed. Accordingly, in third planetary gear unit PG3 that is subjected to a two-inputs and one-output state, the rotation speed of third sun gear S3 and that of third ring gear R3 (=input shaft rotation speed) are determined and thus, the rotation speed of third carrier PC3 is determined. The output rotation of third carrier PC3 (which is higher than that of input shaft IN) is directly transmitted to output shaft OUT to establish the sixth speed.

Figure 11:
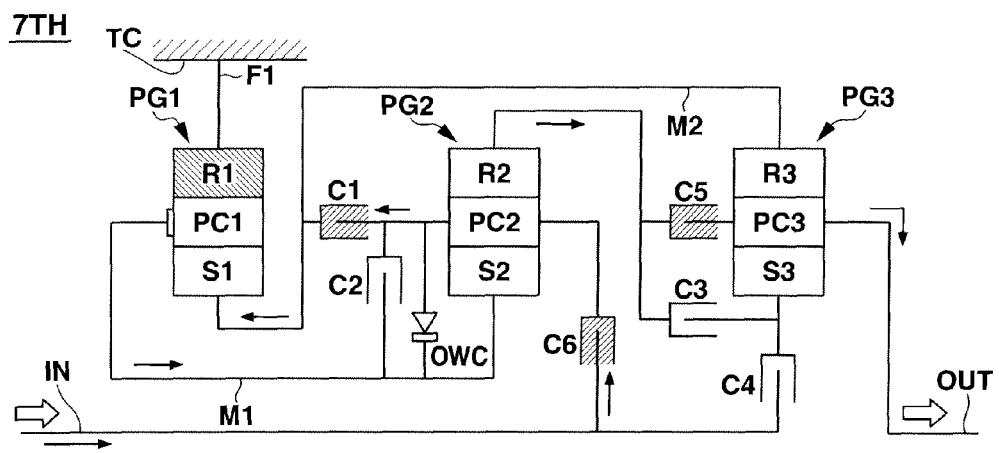
FIG. 11 is a view similar to FIG. 1, but showing a condition wherein the transmission takes a seventh speed (viz., $7^{th}$ speed)

Seventh Speed:

As is indicated by hatched blocks in FIG. 11, for establishing the seventh speed under driving or coasting condition, first clutch C1, fifth clutch C5 and sixth clutch C6 are simultaneously put into their engaged condition.

Due to the simultaneous engaged condition of first clutch C1 and sixth clutch C6 and the presence of second rotatable member M2, input shaft IN, first sun gear S1, second carrier PC2 and third ring gear R3 are tightly connected together. Due to engagement of fifth clutch C5, second ring gear R2 and third carrier PC3 are tightly connected together.

Accordingly, when, under this condition, input shaft IN is rotated at a certain speed, the rotation of input shaft IN is led to first sun gear S1, second carrier PC2 and third ring gear R3. Upon this, in first planetary gear unit PG1 whose ring gear R1 is kept fixed, first carrier PC1 outputs a rotation whose direction is opposite to that of input shaft IN. The rotation of first carrier PC1 is led through first rotatable member M1 to second sun gear S2 without change in speed. Accordingly, in second planetary gear unit PG2 that is subjected to a two-inputs and one-output state, the rotation of second sun gear S2 and that of second carrier PC2 (=input shaft rotation speed) are determined, and thus, the rotation speed of second ring gear R2 is determined. The rotation of second ring gear R2 is transmitted through fifth clutch C5 to third carrier C3 without change in speed. The output rotation of third carrier PC3 (which is higher than that of input shaft IN and higher than a speed provided at the sixth speed) is directly transmitted to output shaft OUT to establish the seventh speed.

Figure 12:
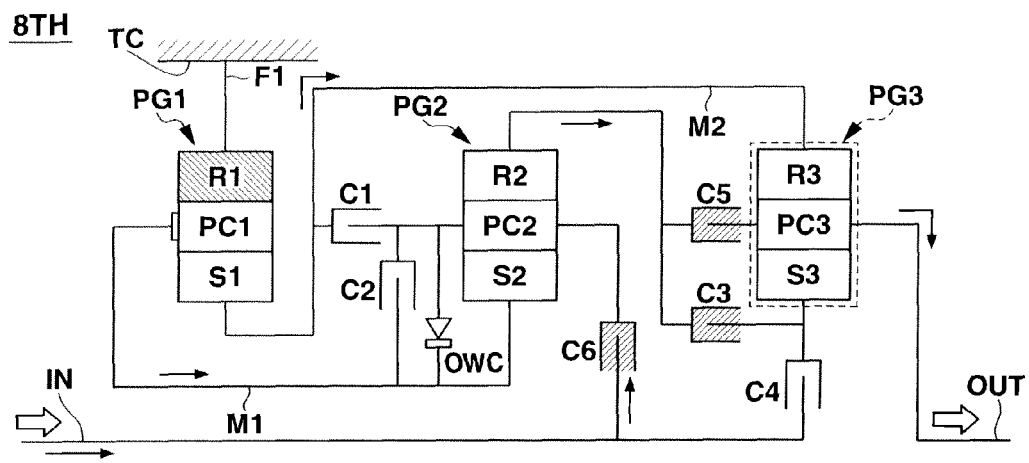
FIG. 12 is a view similar to FIG. 1, but showing a condition wherein the transmission takes an eighth speed (viz., $8^{th}$ speed)

Eighth Speed:

As is indicated by hatched blocks in FIG. 12, for establishing the eighth speed under driving or coasting condition, third clutch C3, fifth clutch C5 and sixth clutch C6 are simultaneously put into their engaged condition.

Due to engagement of sixth clutch C6, input shaft IN and second carrier PC2 are tightly connected together. Due to the simultaneous engaged condition of third clutch C3 and fifth clutch C5 and the presence of second rotatable member M2, the two rotating elements S3 and PC3 of third planetary gear unit PG3 are tightly connected together, so that the three rotating elements S3, PC3 and R3 of third planetary gear unit PG3 are conditioned to integrally revolve and at the same time, first sun gear S1, second ring gear R2 and third planetary gear unit PG3 are tightly connected together.

Accordingly, when, under this condition, rotation of input shaft IN is led to second carrier PC2, second sun gear S2 and second ring gear R2 of second planetary gear unit PG2 and third planetary gear PG3 are rotated while being restricted by first sun gear S1 and first carrier PC1 of first planetary gear unit PG1 whose ring gear R1 is kept fixed. For the restriction effect, first carrier PC1 and second sun gear S2 are conditioned to keep the same rotation speed through first rotatable member M1, and at the same time, first sun gear S1, second sun gear S2 and third planetary gear unit PG3 are conditioned to keep the same rotation speed through third clutch C3, fifth clutch C5 and second rotatable member M2. By the above-mentioned restricting effect, the rotation speed of third planetary gear unit PG3 is determined. The rotation of this third planetary gear unit PG3 is outputted from third carrier PC3. The output rotation of third carrier PC3 (whose speed is higher than that of input shaft IN and a speed provided at the seventh speed) is directly transmitted to output shaft OUT to establish the eighth speed.

Figure 13:
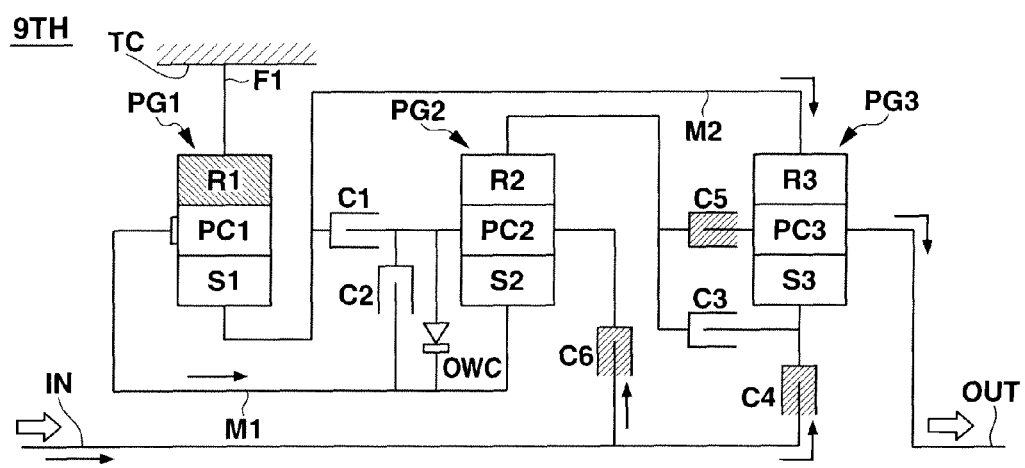
FIG. 13 is a view similar to FIG. 1, but showing a condition wherein the transmission takes a ninth speed (viz., $9^{th}$ speed)

Ninth Speed:

As is indicated by hatched blocks in FIG. 13, for establishing the ninth speed under driving or coasting condition, fourth clutch C4, fifth clutch C5 and sixth clutch C6 are simultaneously put into their engaged condition.

Due to the simultaneous engaged condition of fourth clutch C4 and sixth clutch C6, input shaft IN, second carrier PC2 and third sun gear S3 are tightly connected together. Due to engagement of fifth clutch C5, second ring gear R2 and third carrier PC3 are tightly connected together.

Accordingly, when, under this condition, input shaft IN is rotated at a certain speed, rotation of input shaft IN is led to second carrier PC2 and third sun gear S3. Upon this, second sun gear S2 of second planetary gear unit PG2 and third ring R3 of third planetary gear unit PG3 are rotated while being restricted by first sun gear S1 and first carrier PC1 of first planetary gear unit PG1 whose ring gear R1 is kept fixed. For the restriction effect, first carrier PC1 and second sun gear S2 are conditioned to keep the same rotation speed through first rotatable member M1, and at the same time, first sun gear S1 and third ring gear R3 are conditioned to keep the same rotation speed through second rotatable member M2. By the above-mentioned restriction effect, the rotation speed of third ring gear R3 of third planetary gear unit PG3 is determined. Upon this, in third planetary gear unit PG3 that is subjected to a two-inputs and one-output state, the rotation speed of third sun gear S3 (=input shaft rotation speed) and that of third ring gear R3 are determined, and thus, the rotation speed of third carrier PC3 is determined. The output rotation of third carrier PC3 (which is higher than that of input shaft IN and higher than a speed provided at the eighth speed) is directly transmitted to output shaft OUT to establish the ninth speed.

Figure 14:
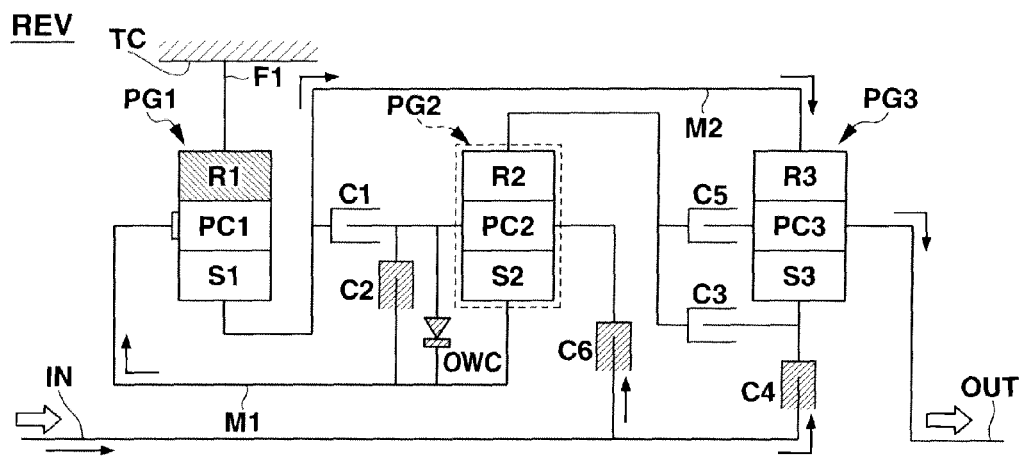
FIG. 14 is a view similar to FIG. 1, but showing a condition wherein the transmission takes a reverse speed.

Reverse Speed:

As is indicated by hatched blocks in FIG. 14, for establishing the reverse speed under driving condition, one-way clutch OWC, fourth clutch C4 and sixth clutch C6 are simultaneously put into their engaged condition, and for establishing the reverse speed under coasting condition, second clutch C2, fourth clutch C4 and sixth clutch C6 are simultaneously put into their engaged condition.

Due to engagement of second clutch C2 (or self-lock of one-way clutch OWC), engagement of fourth clutch C4, engagement of sixth clutch C6 and presence of first rotatable member M1, second sun gear S2 and second carrier PC2 of second planetary gear unit PG2 are tightly connected, so that second sun gear S2, second carrier PC2 and second ring R2 of second planetary gear unit PG2 are conditioned to integrally revolve and at the same time, first input shaft IN, first carrier PC1, second planetary gear unit PG2 and third sun gear S3 are tightly connected together.

When, under this condition, input shaft IN is rotated at a certain speed, rotation of input shaft IN is led to first carrier PC1 and third sun gear S3 and at the same time, second planetary gear unit PG2 is integrally revolved by the input rotation. Accordingly, in first planetary gear unit PG1 whose ring gear R1 is kept fixed, first sun gear S1 outputs a rotation whose direction is opposite to that of input shaft IN. The rotation of first sun gear S1 is transmitted through second rotatable member M2 to third ring gear R3 without change in speed. Accordingly, in third planetary gear unit PG3 that is subjected to a two-inputs and one-output state, the rotation speed of third sun gear S3 (=input shaft rotation speed) and that of third ring gear R3 are determined, and thus, the rotation speed of third carrier PC3 is determined. The output rotation of third carrier PC3 (which is a rotation whose direction is opposite to that of the input shaft rotation speed and slightly higher than that of the input shaft rotation) is directly transmitted to output shaft OUT to establish the reverse speed.

In the following, comparison between the automatic transmission of the present invention and the known automatic transmission of the above-mentioned Japanese Laid-open Patent Application 2001-182785 will be discussed with the aid of FIGS. 15 to 18 in order to clarify advantageous features possessed by the automatic transmission of the present invention.

Figure 15:
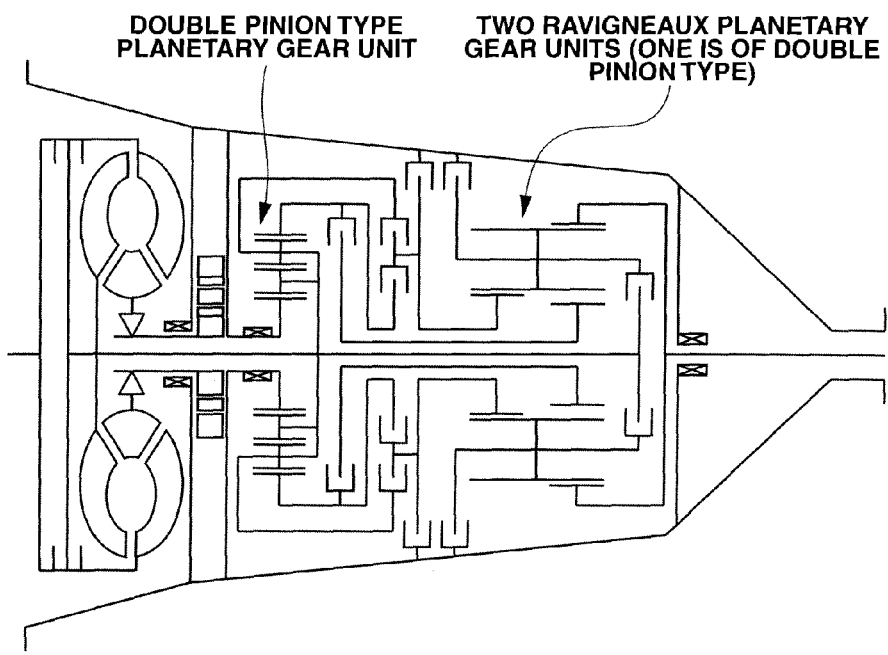
FIG. 15 is a schematic diagram of a known automatic transmission of the related art.

FIG. 15 is a schematic view of the known automatic transmission. FIG. 16 is a table showing ON/OFF condition of sixth frictional elements used in the known automatic transmission at each speed (viz., eight forward speeds and two reverse speeds), each speed being established by simultaneously putting selected two of the sixth frictional elements into their engaged condition. FIG. 17 is a table showing the number of engagements of gears at each forward speed (viz., eight forward speeds) in the known automatic transmission. FIG. 18 is a table showing the maximum torque share rate of each frictional element in the known automatic transmission.

When the drawing and tables shown in FIGS. 1 to 4 that represent the automatic transmission of the invention and those shown in FIGS. 15 to 18 that represent the known automatic transmission are compared, the followings will be clarified.

(A) Basic Construction:

Both automatic transmissions comprise three planetary gear units and six frictional elements for establishing at least eight forward speeds and one reverse speed. In this connection, it is evaluated that the basic performance is substantially the same.

(B) Speed Change Control:

In both automatic transmissions, a speed change from one speed to a next speed and a speed change from one speed to a one-skip next speed are carried out by a so-called one-to-one replacement speed change wherein disengagement of one frictional element and engagement of another frictional element are made at generally the same time. Also, in this characteristic, it is evaluated that the basic performance is substantially the same in both automatic transmissions.

(C) Gear Ratio:

In both automatic transmissions, the gear ratios $\rho 1$, $\rho 2$ and $\rho 3$ of first, second and third planetary gear units PG1, PG2 and PG3 are set in a range from 0.3 to 0.65 in absolute value. Also in this characteristic, it is evaluated that the basic performance is substantially the same in both automatic transmissions.

(D) Friction Loss at Each Speed:

When establishing each speed by engaging frictional elements, it is impossible to avoid a friction loss caused by a so-called oil dragging resistance produced by the frictional elements which are in their idling condition. As is known, in the automatic transmissions comprising the frictional elements, it is of course preferable to reduce the inevitably produced frictional loss as small as possible.

As is seen from the table of FIG. 16, for establishing each speed in the known automatic transmission, two frictional elements are simultaneously put into their engaged condition. Thus, when the transmission takes, for example, the first speed, frictional elements that are subjected to an idling are second clutch C2, third clutch C3, fourth clutch C4 and first brake B1. That is, when the known transmission takes the first speed, four frictional elements C2, C3, C4 and B1 are in their idling condition.

As is seen from the table of FIG. 16, each speed is established by simultaneously putting selected two of six frictional elements C1, C2, C3, C4, B1 and B2 into engaged condition leaving the remaining four frictional elements in their idling condition. That is, four frictional elements are subjected to idling in each speed. Total oil dragging resistance caused by the idling four frictional elements is remarkable and thus the friction loss caused by such oil dragging resistance is remarkable, which lowers the transfer efficiency of drive power from the engine to the driven road wheels. That is, due to the four idling frictional elements, the known automatic transmission provides an associated engine with a poor fuel economy.

While, as is seen from the table of FIG. 2, for establishing each speed in the automatic transmission of the present invention, three frictional elements are simultaneously put into their engaged condition. Thus, when the transmission takes, for example, the first speed, frictional elements that are subjected to idling are first clutch C1, third clutch C3 and sixth clutch C6. That is, only three frictional elements are subjected to idling in the first speed.

As is seen from the table of FIG. 2, each speed is established by simultaneously putting selected three of six frictional elements C1 to C6 into engaged condition leaving the remaining three frictional elements in their idling condition. That is, only three frictional elements are subjected to idling in each speed. Total oil dragging resistance caused by the idling three frictional elements is small as compared with that effected by the idling four frictional elements of the known automatic transmission and thus the friction loss caused by such small total oil dragging resistance is small, which increases the transfer efficiency of drive power from the engine to the driven road wheels. That is, due to less number (viz., three) of idling frictional elements, the automatic transmission of the invention provides the associated engine with an improved fuel economy.

(E) Speed Change Performance:

In the known automatic transmission, eight forward speeds and two reverse speeds are established by three planetary gear units and six frictional elements.

While, in the automatic transmission of the invention, nine forward speeds and one reverse speed are established by three planetary gear units and six frictional elements. That is, in the invention, a wide choice for the gear ratio of forward speeds is obtained and thus it is possible to provide an associated motor vehicle with a drive force that is quite suitable for the operation condition of the vehicle under cruising, which improves the fuel economy of the vehicle. Furthermore, due to increased number of forward speeds, a gear ratio gap between speeds is reduced, which minimizes a shift shock.

(F) Three Planetary Gear Units:

In case of selecting planetary gear units employed for assembling an automatic transmission, there is a choice of using a single pinion type or a double pinion type. Considering a transfer efficiency of drive power possessed by gears, the double pinion type is superior to the signal pinion type.

As is seen from FIG. 15, in the known automatic transmission, there are employed three planetary gear units which are a double pinion type planetary gear unit, a Ravigneaux-double pinion type planetary gear unit and a Ravigneaux-single pinion type planetary gear unit. That is, in the known automatic transmission, there are employed two double pinion type units, which however causes reduction in diameter of pinions used therein. As is known, reduction in diameter of the pinions lowers durability of the same and thus that of the transmission. Furthermore, usage of two double pinion type planetary gear units increases a parts-count of the transmission and thus increases the cost of the same.

While, in the automatic transmission of the invention, there are employed single pinion type second planetary gear unit PG2, single pinion type third planetary gear unit PG3 and double pinion type first planetary gear unit PG1. That is, in the automatic transmission of the invention, there is employed only one double pinion type planetary gear unit PG1, which provides the automatic transmission of the invention with the following advantages which are not expected from the known automatic transmission.

In the invention, it is possible to provide the pinions of the second and third planetary gear units PG2 and PG3 with larger diameters that provide the pinions with increased mechanical strength. Thus, durability of the pinions is increased. That is, in case of the single pinion type planetary gear unit PG2 or PG3, there are arranged between the sun gear and the ring gear a plurality of single pinions each having a diameter equal to a distance defined between the sun gear and ring gear. While, in case of the double pinion type planetary gear unit, due to its inevitable construction, each of the double pinions arranged between the sun gear and ring gear has a diameter smaller than the distance between the sun gear and ring gear. Due to the larger size, pinions of the single pinion type planetary gear unit have assured durability and higher mechanical strength (viz., strength of teeth) as compared with those of the double pinion type planetary gear unit.

In case of the automatic transmission of the invention, the component count is smaller than that of the known transmission, which is advantageous in reducing cost. For example, if, in case of the double pinion type planetary gear unit, four pairs of double pinions are arranged around a sun gear, the number of pinions used therein is eight. While, in case of the single pinion type planetary gear unit, it is only necessary to arrange four pinions around the sun gear. That is, reduction of component count by four is achieved in the single pinion type planetary gear unit, which induces reduction in cost of the transmission.

In the automatic transmission of the invention, the number of engagements effected by gears at each speed is generally the same as that of the known automatic transmission. That is, in the automatic transmission of the invention, the mean number of engagements is 5.00 as is seen from the table of FIG. 3, and in the known automatic transmission, the mean number of engagements is 4.75 as is seen from the table of FIG. 17. That is, both the automatic transmission of the invention and the known automatic transmission exhibit substantially same performance in power transfer efficiency of gears and gear noise.

(G) Gear Ratio Coverage (Ratio Coverage):

The gear ratio coverage (or RC) is calculated by the following equation:

$$RC=\text{gear ratio at the lowest speed/gear ratio at the highest speed} \quad (1)$$

As is known, increase in the gear ratio coverage means increase in gear ratio setting flexibility. It is preferable for an automatic transmission to have an increased gear ratio coverage.

As is seen from the table of FIG. 16, in case of the known automatic transmission, when the gear ratio ρ1 of the double pinion type planetary gear unit is set to −0.375, the gear ratio ρ2 of the Ravigneaux-double pinion type planetary gear unit is set to 0.500 and the gear ratio ρ3 of the Ravigneaux-single pinion type planetary gear unit is set to −0.375, the gear ratio coverage (RC) shows 6.397 (=4.267/0.667).

While, as is seen from the table of FIG. 2, in case of the automatic transmission of the invention, when the gear ratio ρ1 of the first planetary gear unit PG1 is set to −0.493, the gear ratio ρ2 of the second planetary gear unit PG2 is set to 0.658 and the gear ratio ρ3 of the third planetary gear unit PG3 is set to 0.327, the gear ratio coverage (RC) shows 9.637 (=4.086/0.424) keeping a suitable interstage ratio between adjacent speeds. That is, in the invention, with a suitable interstage ratio, the gear ratio coverage shows the value 9.637 higher than the value 6.397 of the known automatic transmission. This means that in the invention, both an acceleration performance of an associated motor vehicle at the lowest speed and a satisfied fuel economy of the vehicle at the highest speed are obtained. It is to be noted that the suitable interstage ratio is obtained from a characteristic curve that is provided by plotting an interstage ratio at each speed and connecting the plotted interstage ratios with a line, the characteristic curve including a first part that smoothly lowers with a small gradient from a lower gear side to a higher gear side and a second part that extends from the first part keeping a constant level.

The rotation speed of the drive force transmitted to the drive road wheels is adjusted by a final gear unit provided at a downstream part of a power train of the transmission. Accordingly, as the gear ratio coverage (RC) increases, degree of freedom for adjusting the final gear unit increases. For example, by adjusting the gear ratio coverage to a lower side, application of the invention to an automatic transmission of a hybrid motor vehicle that hasn't a torque converter is advantageously made. Furthermore, application of the automatic transmission of the invention to gasoline engines and diesel engine that have different characteristics in optimum fuel economy range and highest torque range is advantageously made. That is, in motor vehicles powered by engines, both the acceleration performance and fuel economy are achieved in accordance with the present invention.

(H) Performance in Reverse Speed:

As is known, the gear ratio at the first speed and that at the reverse speed are those that determine acceleration performance and gradeability (or hill-go-up performance) of an associated motor vehicle. That is, if, for example, the ratio between the gear ratio at the first speed and that at the reverse speed is not near 1 (one), a drive force shows a difference at the time when switching is made between forward and reverse positions. Furthermore, if the gear ratio at the reverse speed is lower than that at the first speed, the drive force provided for starting at the reverse speed becomes lower than that provided for starting at the forward speed, and thus, in such case, the acceleration performance at the reverse speed is lowered.

As is seen from the table of FIG. 16, in the known automatic transmission, Rev1/$1^{st}$ is 0.750 and Rev2/$1^{st}$ is 0.469. Thus, when a reverse $1^{st}$ speed (viz., Rev1/$1^{st}$) is selected, insufficient drive power at the reverse speed is prevented. However, when a reverse $2^{nd}$ speed (viz., Rev2/$1^{st}$) is selected, the ratio between the gear ratio at the first speed and that at the reverse speed becomes greatly lower than 1 (one), and thus, the drive force shows a difference at the time when switching is made between forward and reverse positions and the acceleration performance at the reverse speed is lowered.

While, as is seen from the table of FIG. 2, in the automatic transmission of the present invention, Rev/$1^{st}$ is 1.090, and thus the ratio between the gear ratio at the first speed and that at the reverse speed is nearer to 1 (one) than that at the reverse $1^{st}$ speed of the known automatic transmission. Accordingly, in the automatic transmission of the invention, the drive force difference does not appear at the time when switching is made between forward and reverse positions and the acceleration performance at the reverse speed is not lowered. That is, in the present invention, the automatic transmission can be operated without deteriorating the acceleration performance at the lowest speed and the gradeability (or hill-go-up performance) of an associated motor vehicle.

(I) Unit Layout:

As is seen from the table of FIG. 18, in the known automatic transmission, among the maximum torque share rates of six frictional elements C1, C2, C3, C4, B1 and B2, the largest one is 4.800 which is possessed by second brake B2. While, as is seen from the table of FIG. 4, in the automatic transmission of the invention, the largest one is 2.77 which is possessed by second clutch C2 and sixth clutch C6. This means that in the automatic transmission of the invention, each frictional element may comprise a less number of friction plates as compared with those of the known automatic transmission. That is, according to the invention, each friction element is reduced in not only cost but also size.

Reduction of size of the frictional elements brings about reduction of size of the transmission case TC, which establishes a downsized automatic transmission.

(J) Frictional Elements:

Frictional elements used in a planetary gear unit comprise two clutches that selectively stop and allow rotation of two of three rotation members (viz., sun gear, pinion carrier and ring gear) and a brake that selectively stop and allow rotation of the remaining one of the three rotation members. The brake is arranged between the rotation member and the fixed transmission case, and thus driven plates of the brake, which are fixed to the transmission case, are constantly at a standstill. This causes a difficulty of discharging oil from clearances between the friction plates of the brake even when the drive plates of the brake are rotated applying a certain centrifugal force to the oil. Accordingly, the dragging resistance (viz., resistance against oil shearing) produced when the brake is in its idling condition induces a remarkable friction loss which is greater than that induced by the clutch. Accordingly, it is preferable not to use the friction element as the brake.

As is seen from the table of FIG. 16, in the known automatic transmission, two of the six frictional elements are brakes. That is, in case of brake B1, the same is subjected to idling at $1^{st}$ speed, $3^{rd}$ speed, $4^{th}$ speed, $5^{th}$ speed, $6^{th}$ speed, $7^{th}$ speed, Reverse-1 speed and Reverse-2 speed. While, in case of brake B2, the same is subjected to idling at $2^{nd}$ to $8^{th}$ speed. It is to be noted that from $3^{rd}$ speed to $7^{th}$ speed, both brakes B1 and B2 are in their idling condition. This means that the friction loss is remarked in the known automatic transmission.

While, as is seen from the table of FIG. 2, in the automatic transmission of the invention, no brakes are employed. That is, in the invention, the friction loss is small, which brings about an improved fuel economy of an associated engine.

Furthermore, due to the nature of clutches, there is no need of fixing the driven plates to a fixed member such as the transmission case. This enlarges degree of freedom of layout of the frictional elements.

(K) Speed Change Frequency:

As is seen from the table of FIG. 16, in the known automatic transmission, $6^{th}$ speed is of a direct-drive speed and $1^{st}$ to $5^{th}$ speeds are of an under-drive speed. That is, in the known automatic transmission, the speed change interval set in the under-drive side is small, and thus, if an associated motor vehicle runs in, for example, an urban area repeating stopping and restarting, a so-called busy shift is caused wherein speed changes are frequently carried out, which makes a ride feeling of the vehicle poor.

While, as is seen from the table of FIG. 2, in the automatic transmission of the invention, $5^{th}$ speed is of a direct-drive speed and $1^{st}$ to $4^{th}$ speeds are of an under-drive speed. That is, in the invention, the speed change interval in the under-drive side is larger than that of the above-mentioned known automatic transmission, and thus, the above-mentioned undesired busy shift is suppressed or at least minimized.

According to the present invention, there is provided an automatic transmission which comprises an input shaft IN, an output shaft OUT, a first planetary gear unit PG1 that includes a first sun gear S1, a first ring gear R1 and a first carrier PC1 that carries first double pinions P1s and P1r that mesh with both the first sun gear S1 and the first ring R1; a second planetary gear unit PG2 that includes a second sun gear S2, a second ring gear R2 and a second carrier PC2 that carries second single pinions P2 that mesh with both the second sun gear S2 and the second ring gear R2; a third planetary gear unit PG3 that includes a third sun gear S3, a third ring gear R3 and a third carrier PC3 that carries third single pinions P3 that mesh with both the third sun gear S3 and the third ring gear R3 and six frictional elements C1 to C6; wherein by selectively engaging and disengaging the six frictional elements, a torque of the input shaft IN is transmitted to the output shaft OUT while making a rotation speed change therebetween to establish at least eight forward speeds; wherein the output shaft OUT is constantly fixed to the third carrier PC3, the first ring gear R1 is constantly fixed to constitute a first fixing member Ft, the first carrier PC1 and the second sun gear S2 are constantly connected to constitute a first rotatable member M1, the first sun gear S1 and the third ring gear R3 are constantly connected to constitute a second rotatable member M2, and wherein the six frictional elements are a first frictional element (first clutch C1) that selectively connects the second carrier PC2 and the second rotatable member M2, a second frictional member (second clutch C2) that selectively connects the second carrier PC2 and the first rotatable member M1, a third frictional member (third clutch C3) that selectively connects the second ring gear R2 and the third sun gear S3, a fourth frictional element (fourth clutch C4) that selectively connects the input shaft IN and the third sun gear S3, a fifth frictional element (fifth clutch C5) that selectively connects the second ring gear R2 and the third carrier PC3 and a sixth frictional element (sixth clutch C6) that selectively connects the input shaft IN and the second carrier PC2; and wherein by simultaneously putting selected three of the six frictional elements into their engaged condition, at least eight forward speeds and one reverse speed are established.

By employing three planetary gear units and six frictional elements, the automatic transmission of the invention establishes nine forward speeds and one reverse speed. For the reasons as mentioned hereinabove, friction loss inevitably produced at each speed is reduced, which increases a transfer efficiency of a drive power from an associated engine to driven road wheels of an associated motor vehicle.

In the automatic transmission of the present invention, by simultaneously putting selected three of the six frictional elements into their engaged condition, nine forward speeds are established, in which a first forward speed is established by simultaneously putting second, fourth and fifth frictional elements into their engaged condition; a second forward speed is established by simultaneously putting first, second and fourth frictional elements into their engaged condition; a third forward speed is established by simultaneously putting first, fourth and fifth frictional elements into their engaged condition; a fourth forward speed is established by simultaneously putting first, third and fourth frictional elements into their engaged condition; a fifth forward speed is established by simultaneously putting first, fourth and sixth frictional elements into their engaged condition; a sixth forward speed is established by simultaneously putting first, third and sixth frictional elements into their engaged condition; a seventh forward speed is established by simultaneously putting first, fifth and sixth frictional elements into their engaged condition; an eighth forward speed is established by simultaneously putting third, fifth and sixth frictional elements into their engaged condition; and a ninth forward speed is established by simultaneously putting fourth, fifth and sixth frictional elements into their engaged condition.

With these constructional features, the automatic transmission of the invention has a wide choice for the gear ratio and thus provides the driven road wheels with a finely controlled or adjusted drive power in accordance with an operation condition of an associated motor vehicle. Furthermore, due to increase of number in speed, a gear ratio gap between speeds is reduced, and thus, undesired shift shock can be minimized. Furthermore, both acceleration performance of the vehicle at the lowest speed and satisfied fuel economy of the vehicle at the highest speed are achieved while keeping a suitable interstage ratio. Furthermore, the speed change gap at the under drive speed side is increased and thus undesired busy shift is suppressed. Since all of the six frictional elements are clutches, there is no need of considering brakes that are different in construction to the clutches, and thus the arrangement of the parts of the automatic transmission of the invention is simplified.

In the automatic transmission of the invention, the reverse speed is established by simultaneously putting second, fourth and sixth frictional elements into their engaged condition.

With this feature, even if a gear teeth ratio for suitable gear ratio coverage (RC) and interstage ratio is selected, the reverse gear ratio evaluation value (viz., reverse gear ratio/first speed gear ratio) can be made near 1. Thus, striking drive force difference that would appear at the time when switching is made between forward and reverse positions is suppressed or at least minimized, and acceleration performance at the lower speed and gradeability (or hill-go-up performance of an associated motor vehicle are obtained.

The entire contents of Japanese Patent Application 2010-151660 filed Jul. 2, 2010 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. An automatic transmission comprising:
input and output shafts;
a first planetary gear unit of double pinion type, that includes a first sun gear, a first ring gear and a first carrier that carries first double pinions that mesh with both the first sun gear and the first ring;
a second planetary gear unit of single pinion type, that includes a second sun gear, a second ring gear and a second carrier that carries second single pinions that mesh with both the second sun gear and the second ring gear;
a third planetary gear unit of single pinion type, that includes a third sun gear, a third ring gear and a third carrier that carries third single pinions that mesh with both the third sun gear and the third ring gear; and
six frictional elements, each frictional element including mutually rotatable friction plates that cause production of an oil dragging resistance when the friction element is under idling condition,
wherein by selectively engaging and disengaging the six frictional elements, a torque of the input shaft is transmitted to the output shaft while making a rotation speed change therebetween to establish at least eight forward speeds,
wherein the output shaft is constantly connected to the third carrier, the first ring gear is constantly connected to a first fixing member to be fixed, the first carrier and the second sun gear are constantly connected to constitute a first rotatable member, the first sun gear and the third ring gear are constantly connected to constitute a second rotatable member, and
wherein the six frictional elements are a first frictional element that selectively connects the second carrier and the second rotatable member, a second frictional member that selectively connects the second carrier and the first rotatable member, a third frictional member that selectively connects the second ring gear and the third sun gear, a fourth frictional element that selectively connects the input shaft and the third sun gear, a fifth frictional element that selectively connects the second ring gear and the third carrier and a sixth frictional element that selectively connects the input shaft and the second carrier; and wherein by simultaneously putting selected three of the six frictional elements into their engaged condition, at least eight forward speeds and one reverse speed are established.

2. An automatic transmission as claimed in claim 1, in which by simultaneously putting selected three of the six frictional elements into their engaged condition, nine forward speeds are established, in which:
a first forward speed is established by simultaneously putting second, fourth and fifth frictional elements into their engaged condition;
a second forward speed is established by simultaneously putting first, second and fourth frictional elements into their engaged condition;
a third forward speed is established by simultaneously putting first, fourth and fifth frictional elements into their engaged condition;
a fourth forward speed is established by simultaneously putting first, third and fourth frictional elements into their engaged condition;
a fifth forward speed is established by simultaneously putting first, fourth and sixth frictional elements into their engaged condition;
a sixth forward speed is established by simultaneously putting first, third and sixth frictional elements into their engaged condition;
a seventh forward speed is established by simultaneously putting first, fifth and sixth frictional elements into their engaged condition;
an eighth forward speed is established by simultaneously putting third, fifth and sixth frictional elements into their engaged condition; and
a ninth forward speed is established by simultaneously putting fourth, fifth and sixth frictional elements into their engaged condition.

3. An automatic transmission as claimed in claim 1, in which:
the reverse speed is established by simultaneously putting second, fourth and sixth frictional elements into their engaged condition.

4. An automatic transmission as claimed in claim 1, in which the six frictional elements are all clutches.

* * * * *